United States Patent
Cerf (10) Patent No.: US 6,810,645 B2
(45) Date of Patent: Nov. 2, 2004

(54) STABILIZATION OF BOTTLES ON A CONVEYOR

(76) Inventor: Alain Adrien Cerf, 3301 Gateway Centre Blvd., Pinallas Park, FL (US) 33782

( * ) Notice: Subject to any disclaimer, the term of this patent is extended or adjusted under 35 U.S.C. 154(b) by 165 days.

(21) Appl. No.: 09/810,480

(22) Filed: Mar. 19, 2001

(65) Prior Publication Data

US 2002/0129584 A1 Sep. 19, 2002

(51) Int. Cl.$^7$ ............................................. B65B 35/00
(52) U.S. Cl. ........................... 53/531; 53/543; 53/154
(58) Field of Search ............................. 53/48.2, 48.6, 53/48.7, 154, 543, 557, 448; 198/419.3, 427, 440

(56) References Cited

U.S. PATENT DOCUMENTS

| | | | | |
|---|---|---|---|---|
| 2,678,151 A | * | 5/1954 | Geisler | 53/496 |
| 3,481,107 A | * | 12/1969 | Andblad et al. | 53/229 |
| 3,611,656 A | * | 10/1971 | Chidsey, Jr. | 206/145 |
| 3,660,961 A | * | 5/1972 | Ganz | 53/398 |
| 3,714,756 A | * | 2/1973 | MacInnes et al. | 53/389.1 |
| 3,743,074 A | * | 7/1973 | Sorbie | 198/725 |
| 3,956,868 A | * | 5/1976 | Ganz et al. | 53/48.1 |
| 4,041,674 A | * | 8/1977 | Reid | 198/418.5 |
| 4,274,533 A | * | 6/1981 | Abe | 198/447 |
| 4,287,980 A | * | 9/1981 | Montferme | 198/419.3 |
| 4,684,008 A | * | 8/1987 | Hayashi et al. | 198/436 |
| 4,697,691 A | * | 10/1987 | Zodrow et al. | 198/426 |
| 4,974,721 A | * | 12/1990 | Born | 198/434 |
| 5,209,339 A | * | 5/1993 | Antonissen | 198/436 |
| 5,441,142 A | * | 8/1995 | Schneider | 198/442 |
| 5,555,700 A | * | 9/1996 | Marti | 198/418.6 |
| 5,634,549 A | * | 6/1997 | Mims | 198/441 |
| 5,699,651 A | * | 12/1997 | Miller et al. | 198/418.7 |
| 5,979,147 A | * | 11/1999 | Reuteler | 198/419.2 |
| 6,691,857 B2 | * | 2/2004 | Sanchez de Leon Rodriguez Roda | 198/434 |

* cited by examiner

Primary Examiner—Eugene Kim
Assistant Examiner—Nathaniel Chukwurah
(74) Attorney, Agent, or Firm—Sam Silverberg (57) ABSTRACT

This invention relates to stabilizing the movement of containers on a conveyor and indexing the movement of the containers with respect to the movement of the conveyor. The stabilization minimizes the problem of the containers tipping over or pushing too hard against each other. Indexing the movement of the containers with respect to the movement of the conveyor allows the position of the containers to be known on the conveyor.

20 Claims, 8 Drawing Sheets

STABILIZATION OF BOTTLES ON A CONVEYOR

FIELD OF THE INVENTION

This invention relates to stabilizing the movement of containers on a conveyor and indexing the movement of the containers with respect to the movement of the conveyor. The stabilization minimizes the problem of the containers tipping over or pushing too hard against each other. Indexing the movement of the containers with respect to the movement of the conveyor allows the position of the containers to be known on the conveyor.

BACKGROUND OF THE INVENTION

Figure 1A:
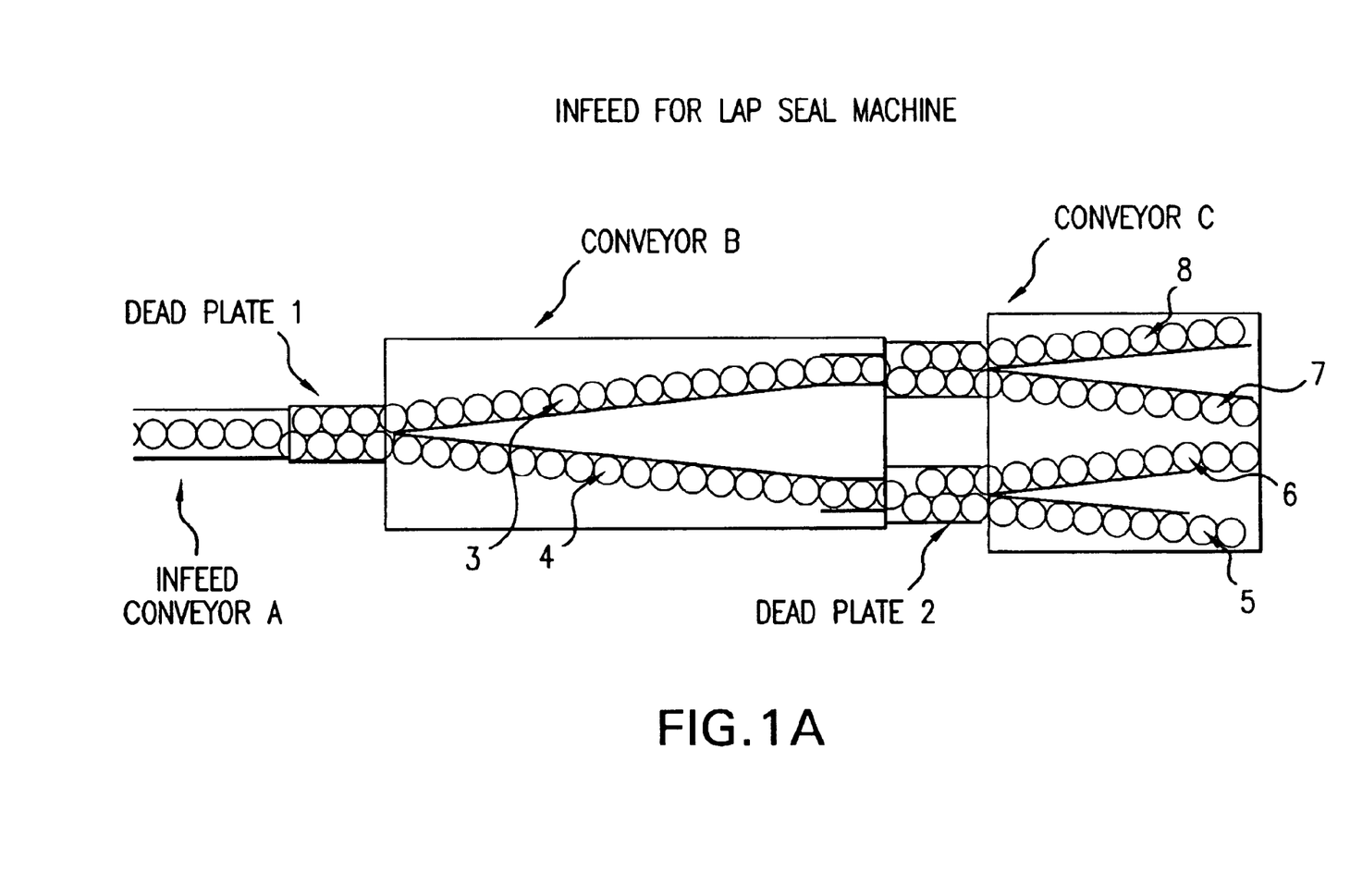
FIG. 1 shows a conveyor system having synchronization means, means to create a lane and means to move a predetermined containers to a wrapping station.
Figure 1B:
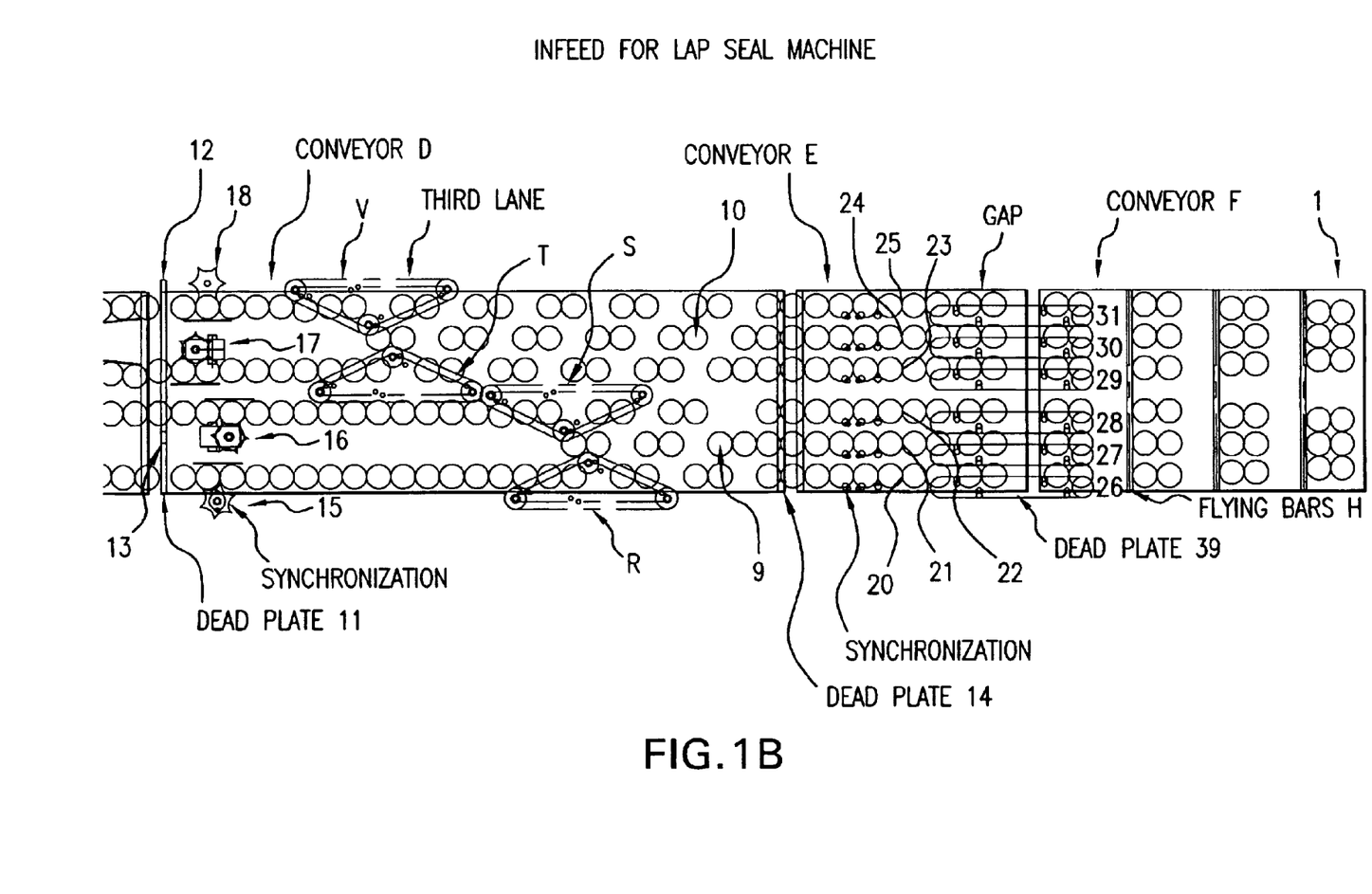

In the prior art, containers such as plastic bottles are moved on conveyors. As shown in FIG. 1, the bottles are placed on a feed conveyor, that moves them to a dead plate. From the dead plate the bottles are pushed on to a second conveyor where the bottles are divided into two lanes of bottles using a diverging plate. The second conveyor usually moves about half the speed of the feed conveyor to accommodate the formation of the two lanes of bottles. The same procedure can be used to create four lanes of bottles.

During a lane formation or transition from a dead plate or to another conveyor or as the speed of the conveyor changes there is a tendency to create gaps between the bottles or to increase the backpressure on the bottles. These gaps between the bottles can result in the bottles tipping over especially when one bottle pushes too hard against another bottle due to the backpressure or when the speed of the conveyor changes. Also backpressure can create clogging in the lanes thereby impeding the flow of the containers. The art has recognized the need to be able to reduce the gaps and the backpressure on the bottles during the operation of the conveyor.

The creation of new lanes in the prior art required increasing the width or length of the conveyor to accommodate new lanes. The need for a conveyor that allows the creation of new lanes without substantially increasing the length or width of the conveyor has not been solved by the prior art.

The movement of the containers from the various conveyors results in the bottles in each lane not being aligned with respect to the movement of a conveyor. This non-alignment of the container interferes with the ability of the conveyor to accommodate downstream operations that depend on the location of the containers.

SUMMARY OF THE INVENTION

An objective of this invention is to stabilize the movement of containers along a conveyor from tipping over and to reduce the gaps and backpressure between the containers. This is accomplished by a synchronization means for positioning the containers with a predetermined spacing. By controlling the spacing, one can establish the desired gap between the containers. The ability to positioning the containers on the conveyor acts to index the location of a container with respect to the speed of the conveyor. Also this positioning of the containers acts to reduce the backpressure by establishing a predetermined relationship between the bottles. Another benefit of positioning the containers is that the containers in each lane can be synchronized with each other.

Another object of this invention is a means for creating new lanes without substantially increasing the width or length of the conveyor. The means for creating a new lane includes a set of overhead conveyors to push the containers from adjacent lanes to form a new lane.

A further objective is to provide a bundling means for moving a predetermined number of containers from one station such as a conveyor or dead plate to another station. The bundling means includes a conveyor to push the predetermined number of containers onto a station for further processing. The further processing-can be a film wrapping station followed by a heat shrink station.

DESCRIPTION OF THE INVENTION

FIG. 1 shows plastic bottles entering dead plate 1 from an input conveyor. Dead plate 1 allows the bottles to arrange themselves due to backpressure so they can be divided into two lanes. The bottles are pushed on to on conveyor B. On conveyor B the bottles are divided from one lane to two lanes 3 and 4 by the use of diverging guides and by the backpressure on the dead plate created by the speed of the conveyor B. As the bottles are divided into two lanes the position of the bottles in each lane on conveyor B become a half of a diameter out of phase with respect to its position on the conveyor. Conveyor B moves at approximately half the speed of the input conveyor A to accommodate the formation of the two lanes without building up excess backpressure. Conveyor B can be split into separate conveyors to accommodate lanes 3 and 4. Conveyor B moves the bottles to dead plate 2 where the bottles are move to conveyor C.

On conveyor C two diverging guides are used to create four lanes of bottles 5,6,7, and 8. For better control, conveyor C can be spit into two conveyors one for lanes 5 and 6 and another conveyor for lanes 7 and 8 to separate the conveyance of the bottles. Conveyor C or the split conveyors runs at about half the speed of conveyor B. Like on conveyor B, the movement of the bottles through the dead plate 11 and the diverging guides cause the bottles in lanes 7 and 8 to become a half a diameter of a bottle out of phase with respect to their position on the conveyor.

By running Conveyor C at half the speed of Conveyor B, the backpressure on the bottles is minimized. Because the bottles are being divided in to two lanes from one lane the relative speed of conveyors create only a slight backpressure at the dead plate. The net effect is the bottles are divided into four lanes 5,6,7 and 8 on conveyor B with substantially no gap between the bottles and with minimum backpressure on each bottle.

The bottles are moved from conveyor C to conveyor D via dead plate 11. As the bottles enter conveyor D a photo electric eyes 12 and 13 are used to monitor the speed of the bottles on the conveyor and the distance between the bottles. Through this monitoring the speed of the conveyor C can be adjusted to accommodate the movement of the bottles on the conveyors and to reduce the gaps and backpressure. However even with this adjustment the spacing of a bottle can vary with respect to another bottle in a lane. This variation is due to small gaps between the bottles created by the changes in speed between the conveyors and the backpressure on the bottles.

The position of the bottles in lanes 5 is a half a diameter out of phase with respect to the bottles in lane 6. Like wise the position of the bottles in lane 7 is a half a diameter out of phase with respect to the bottles in lane 8.

On conveyor D synchronization means 15–18 are used to position the bottles so that the spacing between the bottles in each lane is about the same. By controlling the spacing between the bottles and knowing the speed of conveyor D, the position of bottles can be indexed to the movement of conveyor D. By this indexing the speed of the conveyor D can be defined as function of the diameter of a bottle.

After the bottles are synchronized, conveyor D moves the bottles to a means for creating a lane. Means for creating lane comprises two overhead conveyors R and S having rods that creates a fifth lane 9 by moving bottles from lanes 5 and 6. Likewise, conveyors T and V having rods that move bottles from lanes 7 and 8 to create a sixth lane 10. For the overhead conveyors R–S to create the fifth lane the bottles in lanes 5 and 6 have to be aligned so that the position of a bottle is synchronized with the movement of the rods of conveyors R–S. This alignment is accomplished by a synchronization means 15–16. Synchronization means 15–16 ensures that the bottles are released or leave the synchronization means substantially at the same time for each lane and at the same time maintains the stability of the bottles in the lanes.

The division of the four lanes into six lanes creates a gap the size of a bottle between every two-bottle in a lane. As the bottles leave conveyor D via dead plate 14 and enter conveyor E the bottles have to be stabilized against variations in speed or backpressure that could cause the bottles to tip or jam.

On conveyor E, synchronization means 20–25 positions, stabilizes, and aligns the bottles in each lane. The synchronization means 20–26 must establish the predetermined spacing between the bottles in each lane like the synchronization means 15–18 and be capable of aligning the bottles in lanes 6,7,8, and 9 so that the bottles are in the same position on conveyor E. After the bottles are aligned and stabilized the bottles move to a bundling means 26 that moves a predetermined number of bottles onto conveyor F across dead plate 39. From conveyor F, the predetermined number of bottles is moved by a conventional flying conveyor H to a conveyor I that moves the bottles to a film wrapping station J.

Figure 2:
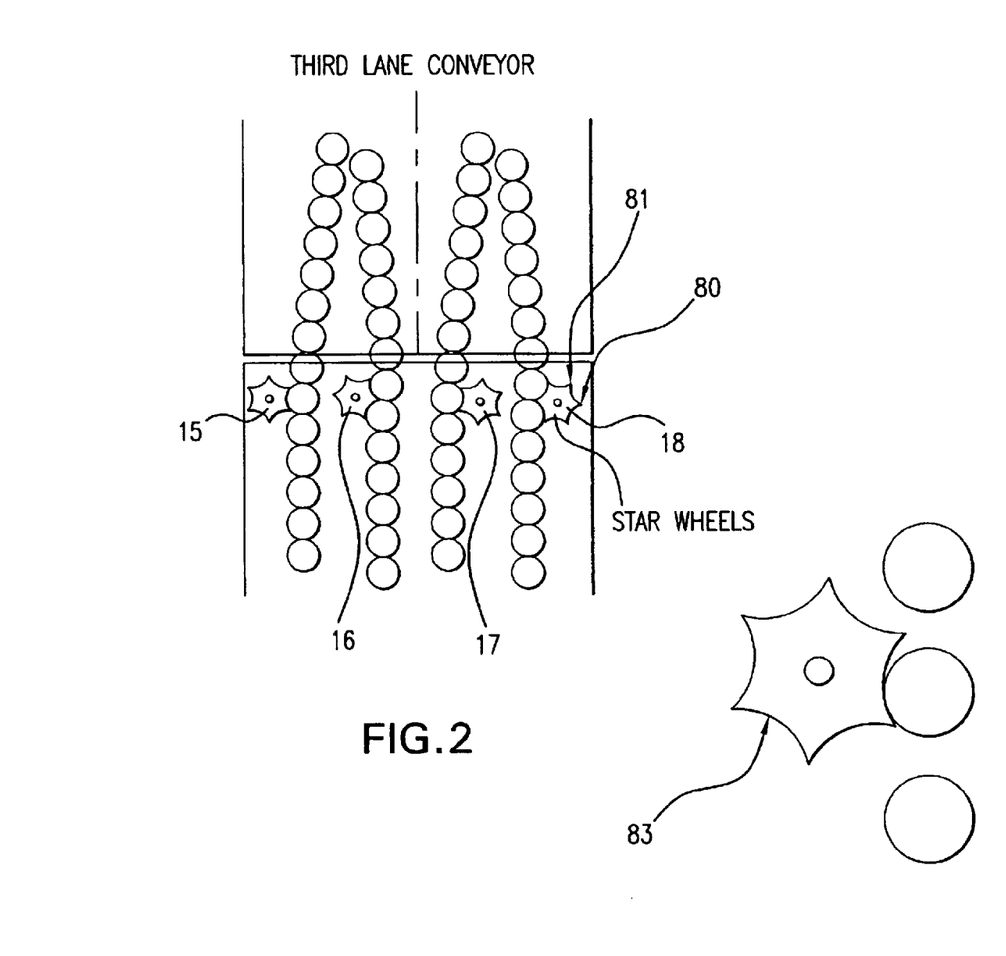
FIG. 2 shows synchronization means using star wheels in combination to position the containers.
Figure 3:
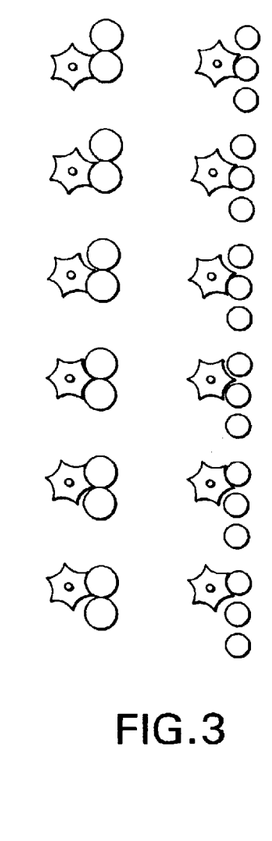
FIG. 3 shows a star wheel to be used with gaps between the bottles.

FIG. 2 shows synchronization means 15–18. The rotation of the star wheel 15 positions and aligns the containers in a lane. The points on the star wheel such as 80 and 81 force adjacent bottles to conform to the gaps between the points. By rotating the star wheel at the about the same speed of the conveyor, the points of the star wheel force the points into the gaps between the bottles. By positioning each bottle in an approximately fixed space relationship, the location of the bottles can become indexed to the speed of the conveyor. By rotating the star wheels in each lane at the same speed the containers in each lane can leave or be released from the star wheel at the same time or in a fixed distance from each other.

The star wheel is driven by connection to the main drive by conventional mechanisms such as gears chains sprockets.

As the bottles are released or leave the synchronization means 15–18 they travel to a means for creating a lane. The means for creating a lane includes two sets of overhead conveyors R and S. Conveyors R and S move bottles from the third and fourth lanes 56 to create the fifth lane 9.

Figure 4:
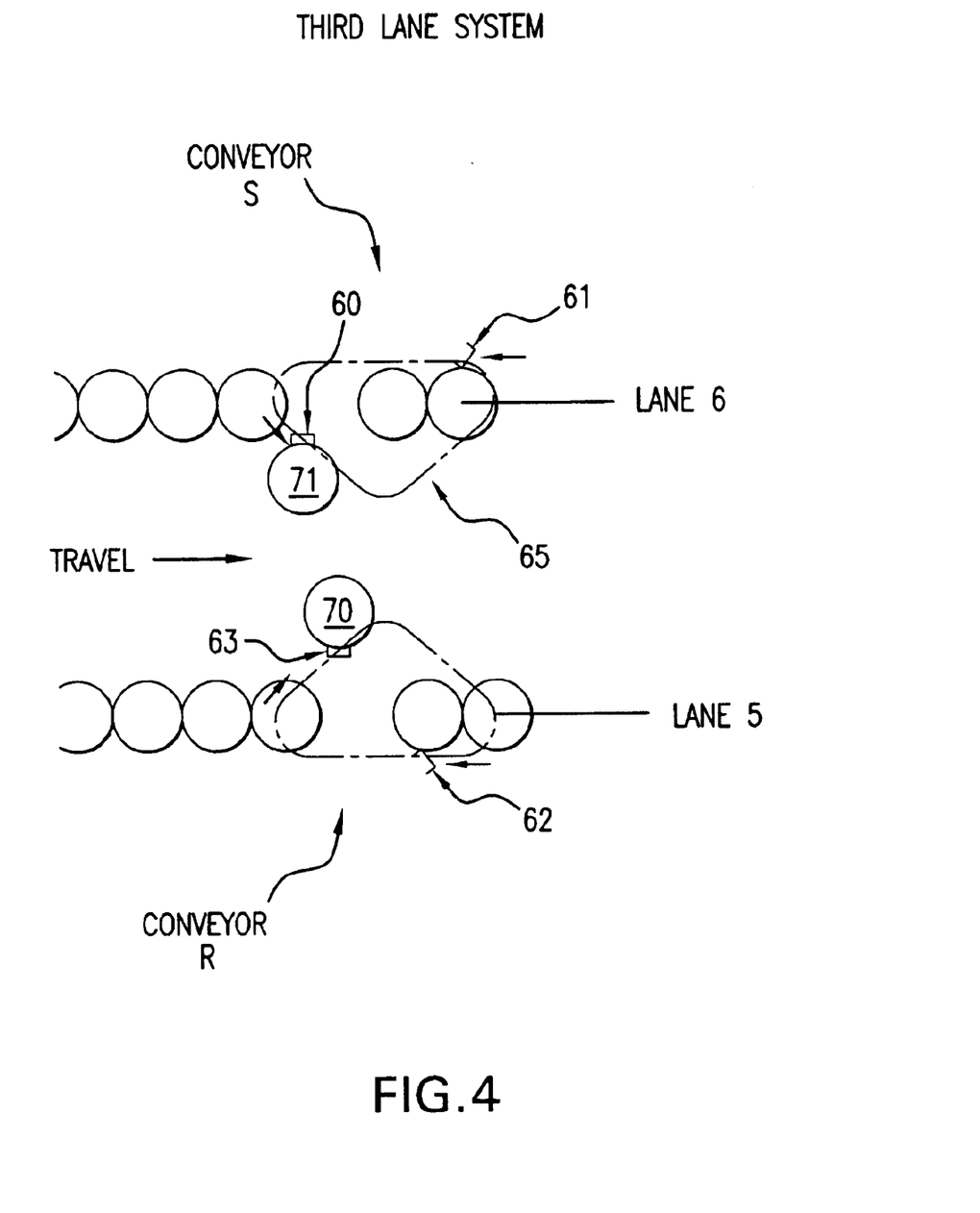
FIGS. 4–6 show a means to create a third lane from two adjacent lanes.
Figure 5:
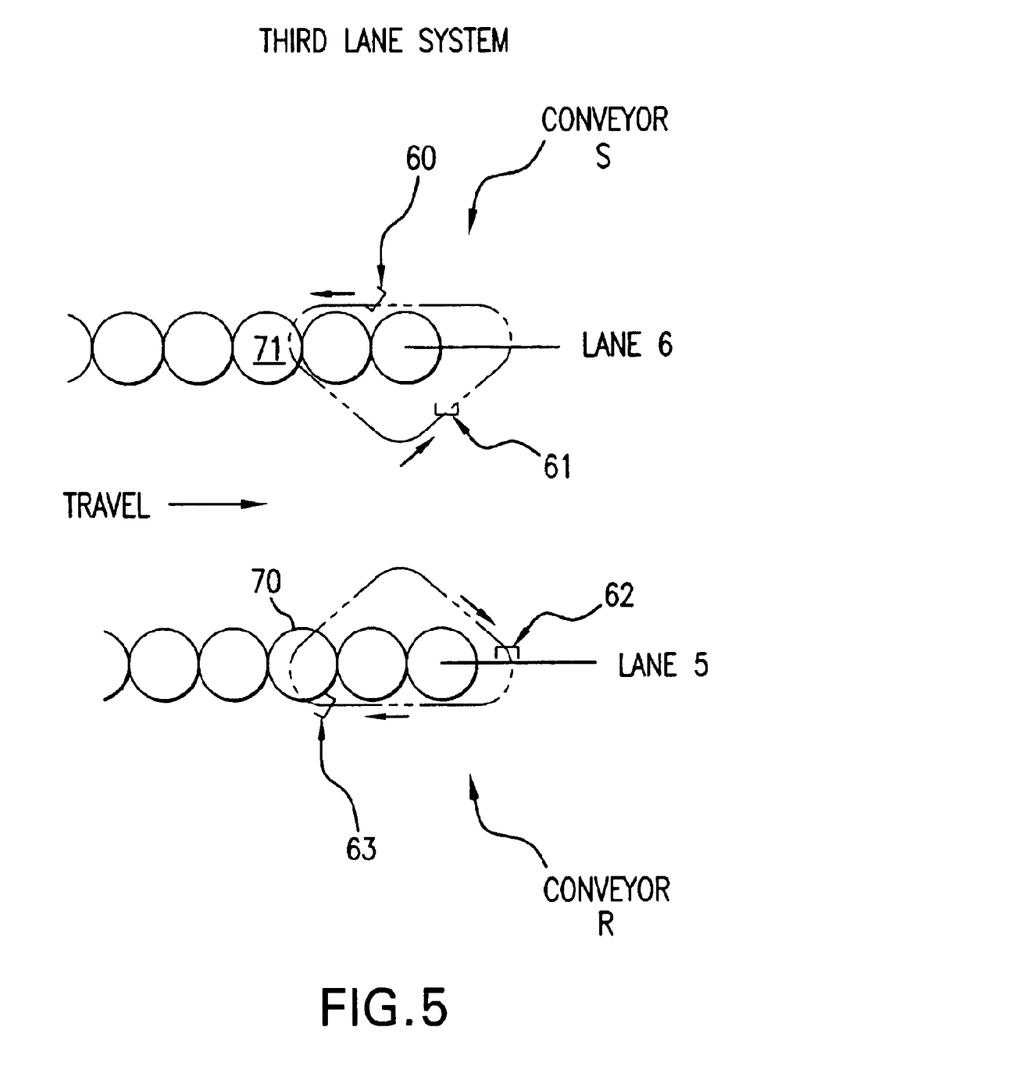

FIGS. 4 and 5 shows a top view of conveyors R and S located above the bottles. Conveyor S has two arms 60 and 61 moving in a counter clockwise direction driven by drive chain or belt travelling along path 65. The drive chain or belt is powered through the main drive on the wrapping machine. Likewise, conveyor R has two arms 62 and 63 moving in a clockwise direction. The arms are being driven at a speed faster than the speed of conveyor D on path 65. The speed of the arms when travelling along path 65 must be sufficient to allow the arm to move back through opening created where a bottle has been removed lane 4. This requires that the arm travel in the conveyor direction at the same speed as the conveyor.

FIGS. 4–5 show the travel of the rods and bottles to create fifth lane 5. The arms move every third bottle in lanes 5 and 6 to create the fifth lane 9. Arm 63 pushes bottle 70 into lane 9 and returns to push another bottle by moving through the gap created by removing bottle 70 from lane 5. Likewise, arm 60 moves bottle 71 from lane 6 creating a gap in lane 6. After moving bottle 71 to lane 9, arm 63 returns through the gap to push another bottle to lane 9. Arms 61 and 62 push bottles into the fifth lane 9 as they intersect the bottles in lanes 5 and 6. The number of rods depends on the speed of the conveyor and the diameter of the bottles and the path of travel selected. For a given diameter bottle the conveyors R and S can be mechanically linked together to create the lane and driven via a connection to the main drive on the wrapping machine.

For the arms of conveyors R and S to locate the bottles in lane 5, these conveyors have to be indexed to the movement of the bottles on conveyor D as a function of the diameter of a bottle. Synchronization means 15–16 allows bottles to be indexed for the operation of conveyors R and S. Conveyors R and S are configured to locate a bottle with respect to a given diameter of a bottle.

For any change in the diameter of bottle the conveyor R and S would have to be reconfigured to accommodate the change in diameter. To alleviate the problem of reconfiguring the conveyors R and S, the synchronization means 15 and 16 is used to space and position the bottles so the arms of the conveyors R and S are in registry with the center line of the bottles.

Figure 6:
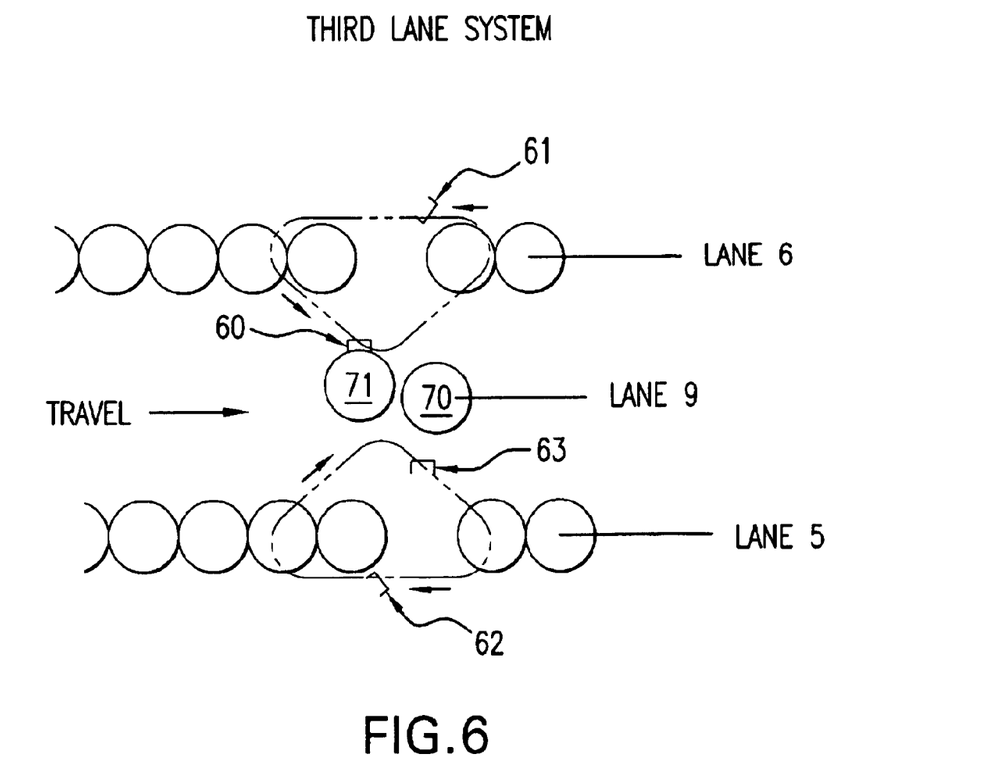

The positioning of smaller diameter bottles requires creating a gap between the bottles so that the centerline of the smaller diameter bottles is in about the same position as the centerline of the largest diameter bottle to be processed. Speeding up conveyor D in relation to conveyor C creates a gap between the bottles as the bottles leave dead plate 11. An automatic control mechanism such as an electric eye can indicate the size of the gap created. A star wheel can be sized to position and create the desired spacing between the bottles. Different star wheels could be used for different diameter bottles. FIG. 6 shows a reconfigured star wheel 83 for establishing the gaps between bottles.

Conveyor D moves these bottles to a conveyor E via dead plate 30. Since conveyor H moves at a slower speed the gaps between these bottles will begin to close.

On conveyor E synchronization means 26–31 operates in the same manner or to provide the same function as the synchronization means 15–18. The bottles in each lane entering conveyor E are stabilized and aligned so they are moving with a predetermined spacing to a bundling means for moving a predetermined number of bottles.

Figure 7:
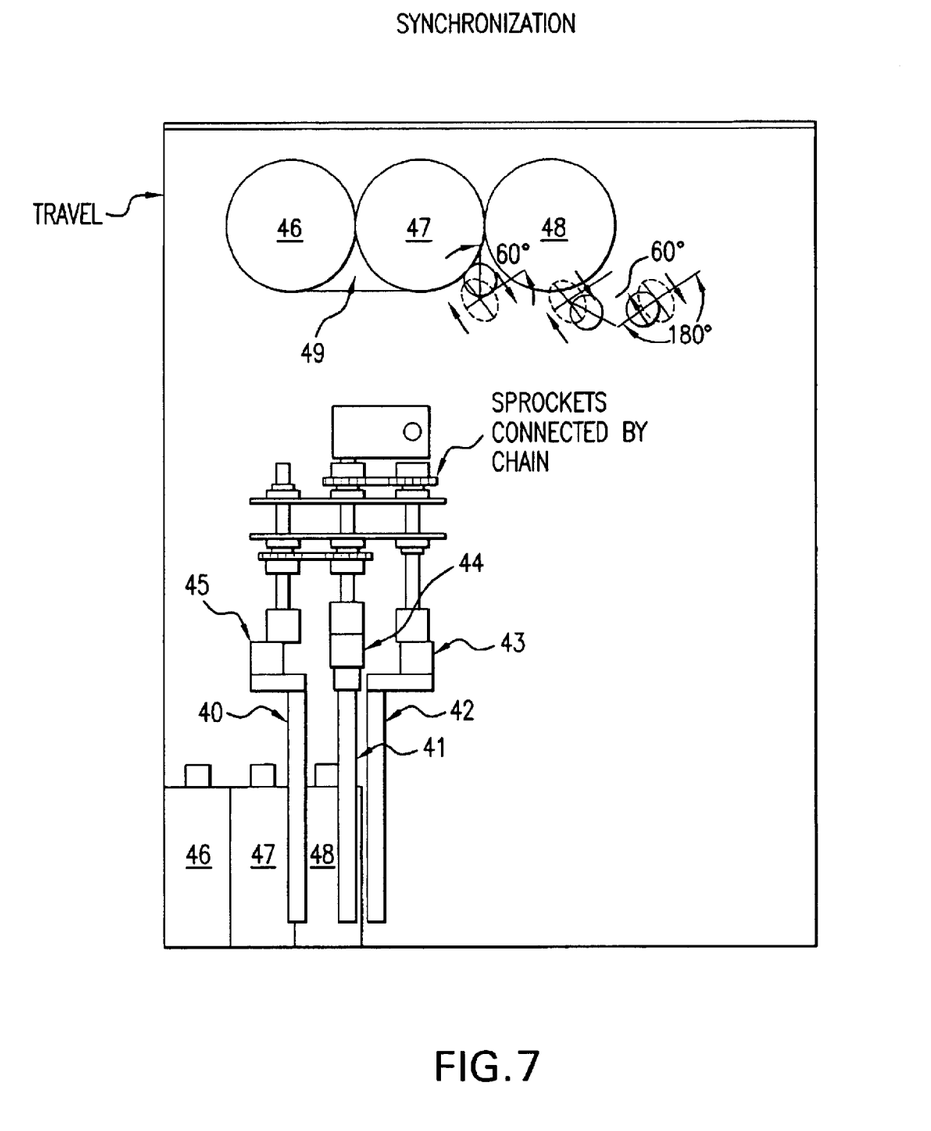
FIG. 7. shows a means to synchronize containers by revolving rods into a space between containers.
Figure 8:
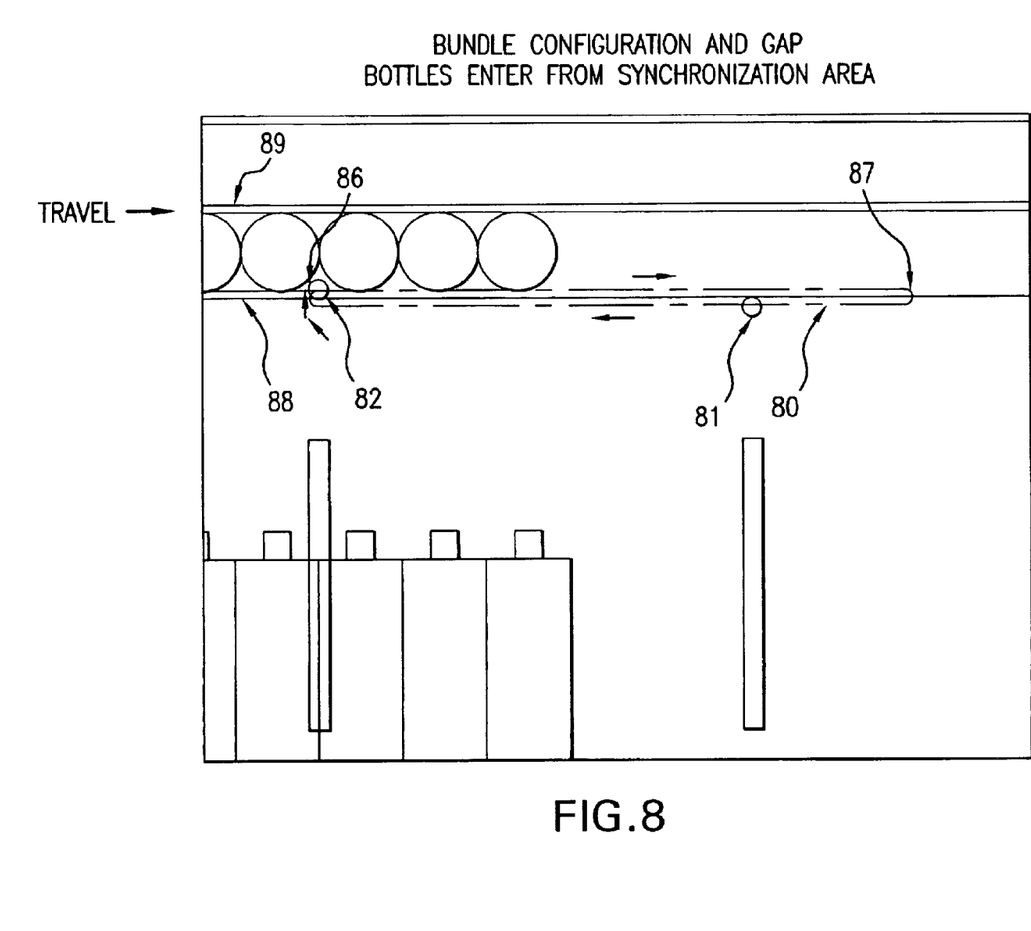
FIG. 8 shows a means to move a predetermined number of containers for bundling.

FIG. 7 shows the operation of synchronization means 26. The synchronization means has rods 40, 41 and 42 revolving in a specified pattern established by their respective cams 43, 44, and 45. The cams are connected so that a belt or chain or sprocket can establish a fixed relationship between the rods.

The function of the rods is to ensure that the bottles in a lane are released in a predetermined manner and to ensure that the spacing between the bottles are approximately the same. By regulating the spacing the backpressure on the bottles is kept at a minimum and the position of the bottles can become indexed to the speed of the conveyor.

The positioning and indexing is accomplished by revolving the rods into a space 49 created between adjacent bottles. The rods enter gap 49 up to a distance where slight contact with a bottle can be made. The rods move in the conveyor direction at a speed slightly less than the speed of the conveyor moving the bottles. By this slower movement of a rod in the same direction as the bottles a small backpressure is created when an unsynchronized bottle pushes against a rod. This pushing slows the movement of the bottles on the conveyor thereby allowing gaps between the bottles to substantially close. Since the position of the rod is synchronized with the movement of the conveyor the position of the bottle as a function of its diameter can be indexed to the movement of the conveyor. The synchronization of each lane can be accomplished by having the rods in each synchronization means revolve into space 49 at the same time causing a slight braking of the bottles in each lane when the bottles are out of synchronization. In this manner the bottles in each lane leave the synchronization means at approximately the same time.

To insure that a bottle does not escape synchronization there must be a sufficient number of rods spaced at set distances to insure that an unsynchronized bottle is slowed by one of the rods. In FIG. 2 the rods are spaced so that the distance between the rods allow the each rod to enter space 49. This distance depends on the diameter of the bottle. The distance is usually ⅔ of the diameter of the bottle. Since the rods move in out of the space 49 there is a possibility that a non-synchronized bottle may not be slowed down by a single rod. To insure that a rod slows a non-synchronized bottle down, three revolving rods are used. These rods are indexed in their revolution 120 degrees apart. Rod 40 would enter space 49 between bottles 46 and 47 revolving in a clockwise direction. By having rod 41 revolving 120 degrees behind rod 40, rod 41 enters space 49 when bottles 30 and 31 move about one diameter of a bottle. Likewise, rod 42 revolves 120 degrees behind rod 41 so that it enters space 49 when bottles 30 and 31 move an additional diameter. Thus the use of three rods ensure that one of the rods will enter space 49 between bottles 30 and 31. When the movement of the bottles is synchronized with the movement of the rods the rods hardly slows the bottles down.

When different diameter bottles are used the size of gap 49 changes. To accommodate different size gaps, cams 43–45 that controls the revolution of the rods into gap 49 would have to be changed to accommodate the new gap and spacing.

FIG. 9 show the means for moving a predetermined number of bottles comprising an overhead conveyor 80 having arms 81 and 82 travelling at speed faster then the conveyor E. The arms travel through openings in the guide 88 to engage the bottles and return to engage a new set of bottles. By travelling at a speed faster then conveyor E, arm 82 can enter the space between two bottles and push a predetermined number of bottles on to conveyor F via dead plate S. Since the speed of the arm 82 is greater than the speed of conveyor E a gap between the predetermined number of bottles is always created. By knowing the position of the bottles in relation to the speed of the conveyor, the speed of conveyor 80 and the locations of the arms can be selected to move a predetermined number of bottles. The arms move the bottles to conveyor F moving at about the same speed as the arms.

It is to be understood that while a certain form of the invention is illustrated, the invention is not limited to the specific form or arrangement of parts herein described. Nor is the invention to be considered limited to what is shown in the drawings and their description. It will be apparent to those skilled in the art that various changes can be made without departing from the scope of the invention.

What is claimed is:

1. A process for creating a third lane of containers from two lanes of containers moving on a first conveyor comprising; synchronizing the position of the containers in the two lanes on the first conveyor with a predetermine spacing between the containers, and after synchronizing
    creating three lanes from the synchronized containers in the two lanes by forming a third lane from the two synchronized lanes of the first conveyor.

2. A process according to claim 1 wherein the three lanes of containers are synchronized on a second conveyor so that the containers are released about same time.

3. A process according to claim 2 wherein a predetermined number of the released containers in each of the lanes are moved to a station thereby creating a gap between the predetermined containers and the remaining containers.

4. An apparatus for moving containers on a conveyor comprising a conveyor for moving a lane of containers, synchronization means for positioning the containers on the conveyor with a predetermined spacing between the containers wherein the synchronization means comprises a conveyor above the containers having substantially vertical rods revolving into the space created between adjacent containers such that the rods movement at a speed slower to the bottles in the direction of movement of the containers so that an unsynchronized, container pushes against the rod and is slowed down and released by the rod.

5. An apparatus according to claim 4 wherein the number of rods are chosen so that an unsynchronized container pusher against one rod.

6. An apparatus according to claim 4 comprising means for moving a predetermined number of containers from a lane to a station thereby creating a gap between the predetermined number of containers and the remaining containers.

7. An apparatus for moving containers on a conveyor comprising;
    a conveyor for moving at least two lanes of containers, synchronization means for each lane for positioning the containers on the conveyor with a predetermined spacing between the container so that the location of the containers in each lane can be indexed, and
    means for creating three lanes from the two lanes by forming a third lane of containers from the containers of the two lanes after leaving the synchronization means on said conveyor.

8. An apparatus according to claim 7 wherein the synchronization means comprising a star wheel for positioning the containers on the conveyor with a predetermined spacing between the containers and wherein the star wheel moves in the conveyor direction at a speed about equal to the speed of the conveyor.

9. An apparatus according to claim 8 wherein the points of the star wheel are designed to position bottles having an open space between adjacent bottle.

10. An apparatus according to claim 9 wherein the open space is created by the speed of the conveyor.

11. An apparatus according to claim 7 wherein the means to create a new lane includes a conveyor having arms that move a container from a lane to create a new lane, wherein the conveyor having arms is located above each of the two lanes.

12. An apparatus according to claim 11 wherein the arm travels along a path that moves a container from a lane to the new lane and returns through the opening created by moving the bottle.

13. An apparatus according to claim 12 wherein the path of travel and the speed of the arm is synchronized with the position of the bottles moving on the conveyor.

14. An apparatus according to claim 7 including means for moving a predetermined number of containers from a lane to a station thereby creating a gap between the predetermined number of containers and the remaining containers.

15. An apparatus according to claim 14 wherein the means for moving a predetermined number of containers is a conveyor above the containers having an arm that moves faster than the bottles on the conveyor.

16. An apparatus according to claim 14 comprising wherein each lane has a second synchronization means for positioning the containers on the conveyor with a predetermined spacing between the containers so that the location of the containers in each lane can be indexed wherein the second synchronization means is located prior to the means for moving a predetermined number of containers from a lane to a station.

17. An apparatus according to claim 16 wherein the second synchronization means comprises a conveyor above the containers having rods revolving into the space created between adjacent containers such that the rods move at a speed slower to the bottles in the direction of movement of the containers so that an unsynchronized container pushes against the rod and is slowed down and released by the rod.

18. An apparatus according to claim 16 including a second conveyor for receiving the containers in each lane wherein the second conveyor has the second synchronization means for positioning the containers in each lane and the second synchronization means in each lane is indexed so that a container is released or leaves each synchronization means about the same time.

19. An apparatus according to claim 18 wherein the second conveyor includes means for moving a predetermined number of containers to a bundling station after the containers hare been released or leave the second synchronization means.

20. An apparatus according to claim 19 including means to move the containers from a bundling station and means for film wrapping the bundles with a heat shrinkable film.

* * * * *